US007677590B2

(12) United States Patent
Dotsey et al.

(10) Patent No.: US 7,677,590 B2
(45) Date of Patent: Mar. 16, 2010

(54) STROLLER HAVING EXTENDABLE HANDLE

(75) Inventors: Michael A. Dotsey, Pottstown, PA (US); Patrick Nolan, Royersford, PA (US)

(73) Assignee: Graco Children's Products, Inc., Atlanta, GA (US)

( * ) Notice: Subject to any disclaimer, the term of this patent is extended or adjusted under 35 U.S.C. 154(b) by 151 days.

(21) Appl. No.: 11/696,154

(22) Filed: Apr. 3, 2007

(65) Prior Publication Data

US 2007/0246917 A1 Oct. 25, 2007

Related U.S. Application Data

(60) Provisional application No. 60/789,240, filed on Apr. 3, 2006.

(51) Int. Cl.
*B62B 1/00* (2006.01)

(52) U.S. Cl. .................. 280/642; 280/647; 280/650; 280/47.38

(58) Field of Classification Search ............... 280/642, 280/639, 655, 650, 647, 47.25, 47.315, 47.38, 280/87.041, DIG. 10, DIG. 5; 16/429, 10.1, 16/421, 436, 427
See application file for complete search history.

(56) References Cited

U.S. PATENT DOCUMENTS

| 613,633 | A | * | 11/1898 | King et al. ................. 403/97 |
| 2,885,223 | A | | 5/1959 | Duff |
| 3,446,523 | A | | 5/1969 | Little |
| 5,060,907 | A | * | 10/1991 | Castano ..................... 248/514 |
| 5,709,400 | A | | 1/1998 | Bonnier et al. |
| 6,059,301 | A | | 5/2000 | Skarnulis |
| 6,099,022 | A | | 8/2000 | Pring |
| 6,193,263 | B1 | | 2/2001 | Lin |
| 6,203,054 | B1 | | 3/2001 | Matsumoto |
| 6,209,892 | B1 | | 4/2001 | Schaaf et al. |
| 6,301,749 | B1 | * | 10/2001 | Chen ........................ 16/429 |
| 6,305,698 | B1 | * | 10/2001 | Liang ..................... 280/87.041 |
| 6,317,923 | B1 | * | 11/2001 | Lo ............................ 16/110.1 |
| 6,398,233 | B1 | | 6/2002 | Liang et al. |
| 6,446,990 | B1 | | 9/2002 | Nania et al. |

(Continued)

FOREIGN PATENT DOCUMENTS

DE 272 827 4/1914

(Continued)

OTHER PUBLICATIONS

International Search Report and Written Opinion from corresponding International application No. PCT/US2007/065894 mailed Sep. 21, 2007.

(Continued)

*Primary Examiner*—Hau V Phan
(74) *Attorney, Agent, or Firm*—Lempia Braidwood LLC

(57) ABSTRACT

A stroller is provided including a stroller frame supported for movement on at least one wheel. The stroller frame supports at least one child seat, and includes a handle that is grasped by the operator to drive the stroller. The handle includes a main handle portion and an auxiliary handle portion that is telescopically connected to the main handle portion. The auxiliary handle portion is thus movable between an extended position and a retracted position relative to the main handle portion.

16 Claims, 7 Drawing Sheets

U.S. PATENT DOCUMENTS

| | | | |
|---|---|---|---|
| 6,478,104 B1* | 11/2002 | Kemper | 280/642 |
| 6,644,675 B2* | 11/2003 | Ellis et al. | 280/642 |
| 6,748,821 B1* | 6/2004 | Smith | 74/551.3 |
| 6,918,608 B2* | 7/2005 | Crisp | 280/642 |
| 7,234,722 B1* | 6/2007 | Madigan et al. | 280/642 |
| 7,370,877 B2* | 5/2008 | Refsum | 280/655 |
| 7,396,038 B2 | 7/2008 | Zweideck | |
| 7,445,228 B2* | 11/2008 | Henry | 280/639 |
| 2004/0026896 A1* | 2/2004 | Crisp | 280/642 |
| 2006/0001226 A1 | 1/2006 | Refsum | |
| 2007/0222188 A1* | 9/2007 | Dean et al. | 280/642 |
| 2007/0228696 A1* | 10/2007 | Pike et al. | 280/642 |

FOREIGN PATENT DOCUMENTS

| | | |
|---|---|---|
| DE | 44 16 737 | 11/1995 |
| DE | 1 911 322 | 9/2007 |
| EP | 900 709 | 3/1999 |
| GB | 2 403 934 | 1/2005 |
| WO | WO 87/02887 | 5/1987 |

OTHER PUBLICATIONS

Britax Preview Lightweight Umbrella Travel System (Jun. 2004).

* cited by examiner

STROLLER HAVING EXTENDABLE HANDLE

RELATED APPLICATION DATA

This patent is related to and claims priority benefit of U.S. Provisional Patent Application No. 60/789,240, which was filed on Apr. 3, 2006 and entitled "Stroller," and which is hereby incorporated by reference in its entirety.

BACKGROUND OF THE INVENTION

1. Field of the Disclosure

The present disclosure is generally directed to baby strollers, and more particularly relates to a stroller having enhanced handle versatility.

2. Description of Related Art

Well-designed strollers should be sturdy and balanced, and should provide the child passenger with safe and comfortable transport. Throughout the development of strollers, an effort has been made to include features that render the stroller versatile and convenient. Efforts have been made to provide these features while achieving a simple design, yet maintaining the stroller rugged and reliable.

A conventional stroller has a plurality of wheels supporting a frame that supports one or more stroller seats. The frame has two spaced front legs, two spaced rear legs, one or more push arms, and a crossbar connected at its laterally outer ends to the push arms. The crossbar can be provided with a pair of laterally spaced gripping surfaces that can be engaged by a user when driving the stroller, and a handle assembly disposed between the gripping surfaces.

Unfortunately, conventional handle assemblies, and in particular the gripping surfaces, are positioned directly behind the child seat. As a result, when the stroller operator wishes to make visual contact with, communicate with, or otherwise assist the seated child, the position of the handles unfortunately do not allow the operator to do so without first stopping and braking the stroller and then walking over to the seated child to render assistance. The need to stop and brake the stroller reduces the utility of the stroller, and causes various inefficiencies during operation.

What is therefore needed is a more versatile stroller that enables the operator to attend to certain child-related tasks while maintaining his or her grip on the handlebar.

SUMMARY

In accordance with one aspect of the present invention, a stroller is provided having a stroller frame supported by at least one rotatable wheel. A child seat is supported by the stroller frame. A laterally extending handle is supported by the stroller frame. The handle includes a first handle section and a second handle section movably connected with respect to the first handle section. The second handle section is movable in the lateral direction relative to the main first section between an extended position. The second handle section is separated from the first handle section by a gap having a first distance, and a retracted position whereby the gap has a second distance less than the first distance.

It should be appreciated that the foregoing and other aspects of the invention will appear from the following description. In the description, reference is made to the accompanying drawings which form a part thereof, and in which there is shown by way of illustration, and not limitation, preferred embodiments of the invention. Such embodiments do not necessarily represent the full scope of the invention, and reference must therefore be made to the claims herein for interpreting the full scope of the invention.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

The disclosed stroller improves upon one or more of the above-noted problems and/or disadvantages in the prior art. For instance, the stroller includes a frame supported by at least one wheel for movement along a ground surface. The stroller frame further includes a laterally extending handle including a pair of handle sections. At least one of the handle sections is movable from a retracted position to an extended position relative to the other handle section.

Figure 1:
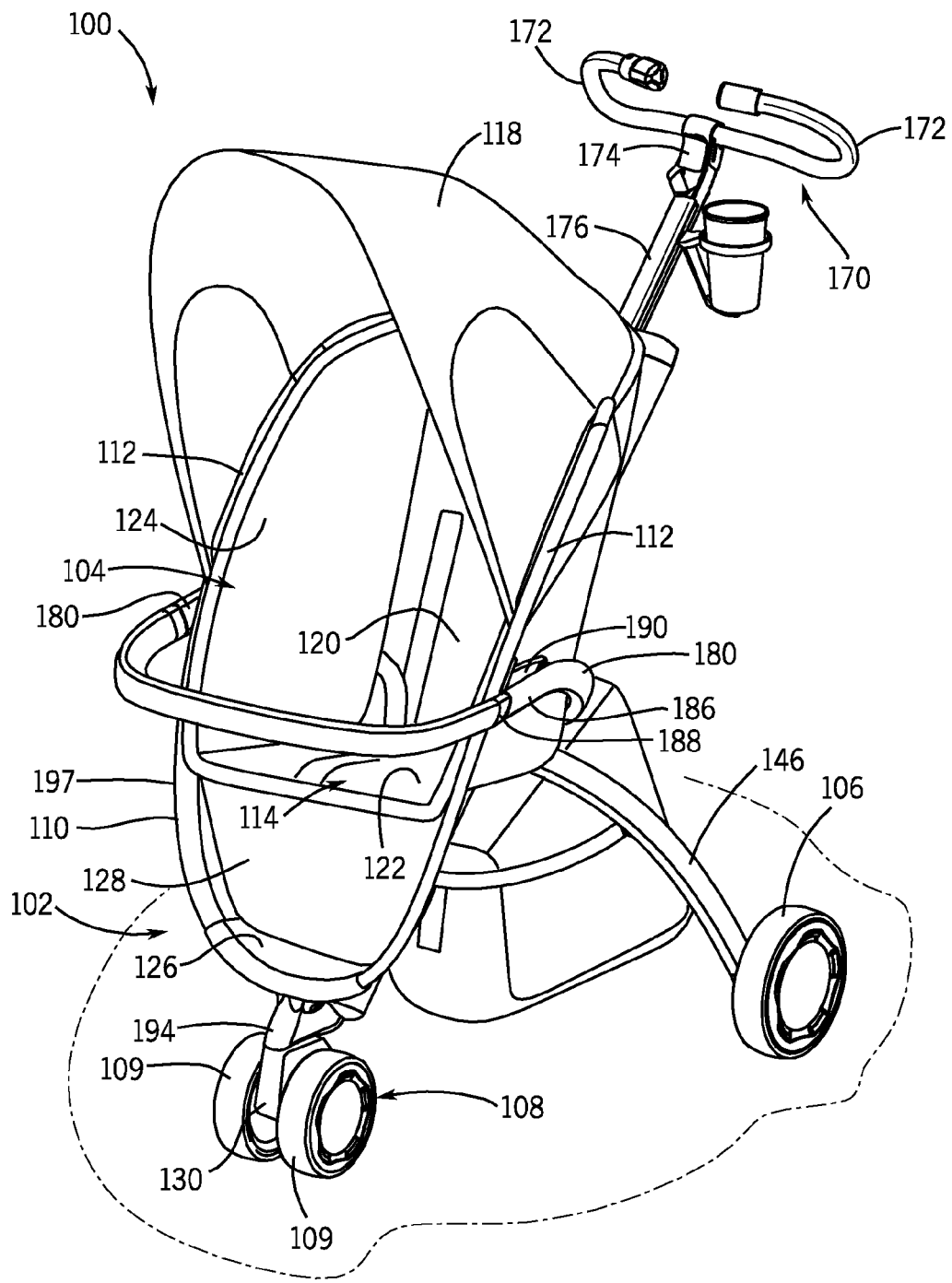
FIG. 1 is a perspective view of a stroller constructed in accordance with certain aspects of the present invention.

Turning now to the drawings, a stroller 100 is depicted in FIG. 1 and is constructed in accordance with the teachings of the present invention. In the disclosed example, the stroller 100 generally has a frame 102, a seat assembly 104 supported by the frame 102, and a plurality of wheels supporting the frame 102 on a ground surface. In general, the frame 102 in the disclosed example includes a pair of rear wheels 106 and a single front wheel assembly 108 positioned forward of and at a mid point between the rear wheels. In this example, the front wheel assembly has two wheels 109 spaced apart side by side.

The frame 102 in this example generally has a seat mounting frame 110 that is a U-shaped component. In the disclosed example, the seat assembly 104 can be removed from the seat frame 110 and the stroller 100. In general, the removable seat assembly 104 includes a pair of seat attachment tubes 112 positioned on opposite sides of an occupant seat 114. The seat tubes 112 are connected to and can be removed from upper ends 116 of the seat frame 110. The seat 114 of the seat assembly 104 is supported on the stroller at least in part by the seat tubes 112 and has a canopy 118 connected to an upper part of the seat. The seat 114 also has a seat back 120, a seat bottom 122, and seat side wings 124 positioned on opposite sides of the seat back and the seat bottom.

A footrest 126 is positioned at the bottom of the seat assembly 104 and is suspended from the front edge of the seat bottom 122 by a mesh fabric panel 128 in this example. The footrest 126 is also connected to the lower part of the seat frame 110. In the disclosed example, the seat 104 can be made entirely of fabric or like materials and be suspended from the seat tubes 112 and the seat frame 110, when attached. Alternatively, portions of the seat assembly 104 can have a removable cover placed over a generally rigid supporting structure that defines and shapes at least part of the seat, such as the seat bottom 122 and parts of the seat side wings 124. Thus, once attached to the seat frame 110, the seat assembly 104 can be sufficiently supported on the stroller and substantial enough to support the weight of a child occupant. As will be evident to those having ordinary skill in the art, the configuration and construction of the seat assembly 104 and the seat 114 can vary considerably and yet fall within the spirit and scope of the present invention.

The stroller frame 102 in the disclosed example generally has a central spine 140 with a lower end 142 positioned near the front wheel assembly 108. The spine 140 also has an upper end 144 positioned behind the seat back 120 of the seat assembly 114 and between the rear wheels 106. A pair of curved rear legs 146 extends downward in opposite directions from an underside of the spine 140. Each leg 146 is bowed outward and extends in a rearward and downward direction. A proximal or top end 148 of each leg is coupled to a rear leg connector 150 positioned on the underside of the spine 140. The connector 150 is positioned in this example about midpoint between the upper end 144 and the lower end 142 of the spine 140. A distal or lower end 152 of each rear leg 146 in this example carries one of the rear wheels 106.

A rear leg link 154 is positioned on each side of the frame 102 and links each rear leg 146 to the spine 40. Each link 154 has one end 156 coupled to a connector 158 on the underside of the spine 140 positioned below the rear leg connector 150 along the spine. Each link 154 also has another end 160 coupled to a corresponding one of the rear legs 146. The links 154 provide stability for the stroller frame 102, and particularly for the rear legs 146, during use.

The frame 102 in the disclosed example also has a stroller handle 170 for pushing and maneuvering the stroller 100. The disclosed handle 170 generally has an upward facing, open C-shape provided by a pair of handle sections 172 and 173 that extend in opposite directions from a handle bracket 174. The handle bracket 174 is coupled to a stanchion 176 that extends from the upper end 144 of the frame spine 140. In the disclosed example, the stanchion 176 is essentially a linear structure and extends parallel to and is aligned with the spine 140, which is also a generally linear structure.

The stroller 100 disclosed herein also has a pair of curved seat frame support arms 180. The support arms 180 extend upward in opposite directions from the top side of the spine 140. Each support arm 180 is bowed outward and extends in a forward and upward direction relative to the spine 140. A proximal or bottom end 182 of each support arm 180 is coupled to a support arm connector 184 positioned on the top side of the spine 140. The support arm connector 184 in this example is positioned at the same location along the spine as the rear leg connector 150, which is on the underside of the spine. A distal end portion 186 of each support arm 180 is bent downward, extends generally horizontally forward, and terminates at an exposed end or face 188.

In this example, a seat frame link 190 is positioned on each side of the seat frame 110 and extends in a rearward direction. Each seat link 190 has a free end 192 that is coupled to one of the support arms 180. The connection point between each seat link 190 and the respective support arm 180 in this example is spaced rearward from the exposed end 188 along the distal end portion 186.

Also in the disclosed example, a frame bracket 194 is located at the lower front portion of the frame 102. The frame bracket 194 is connected to the lower most portion 196 of the seat frame 110 and to the lower end 142 of the spine 140. The front wheel assembly 108 is mounted to and extends downward from the frame bracket 194. The frame bracket 194 links the spine 140 to the seat frame 110 and provides the front wheel mounting location in the disclosed example.

Figure 2:
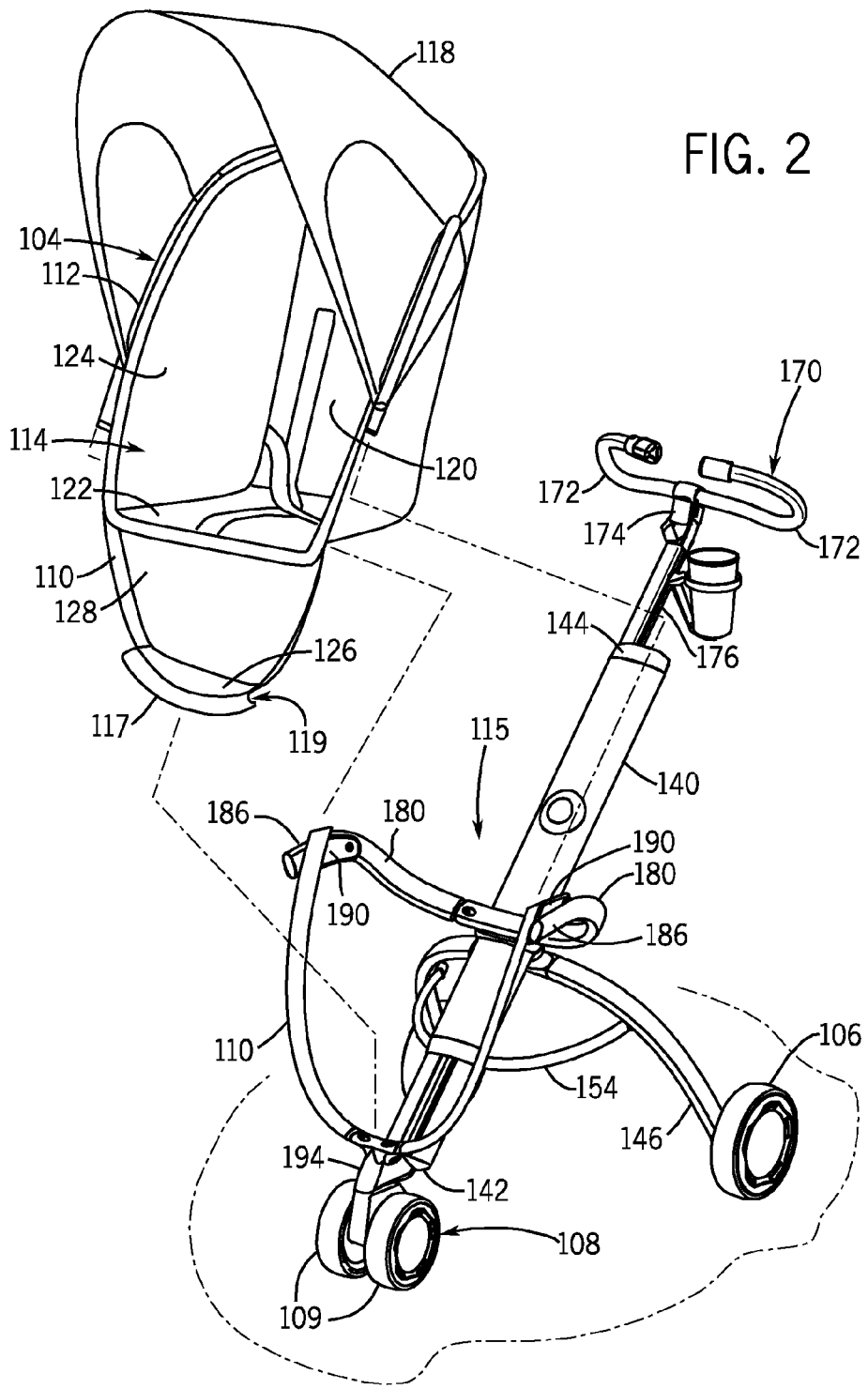
FIG. 2 is an exploded perspective view of the stroller illustrated in FIG. 1 showing the attachment of a child seat assembly onto a stroller frame.

The spine 140 is oriented centrally between the rear wheels 106 and defines a central or longitudinal axis of the stroller 100. In the disclosed example as shown in FIG. 2, the spine 140 is oriented at an angle with a low point at its lower end 142 and a high point at its upper end 144. The spine is oriented to position the handle 170 so that a caregiver can stand behind the stroller and push the stroller in a conventional manner by the handle 170. The seat assembly 104 is positioned above and forward of the spine 140 and faces forward relative to the stroller 100 away from the handle 170. However, the arrangement of the seat and frame components disclosed herein can vary and yet fall within the spirit and scope of the present invention. Additionally, the shape, size, configuration, orientation, and location of the various frame and seat assembly components can also vary from the example shown without departing from the spirit and scope of the present invention.

Figure 3:
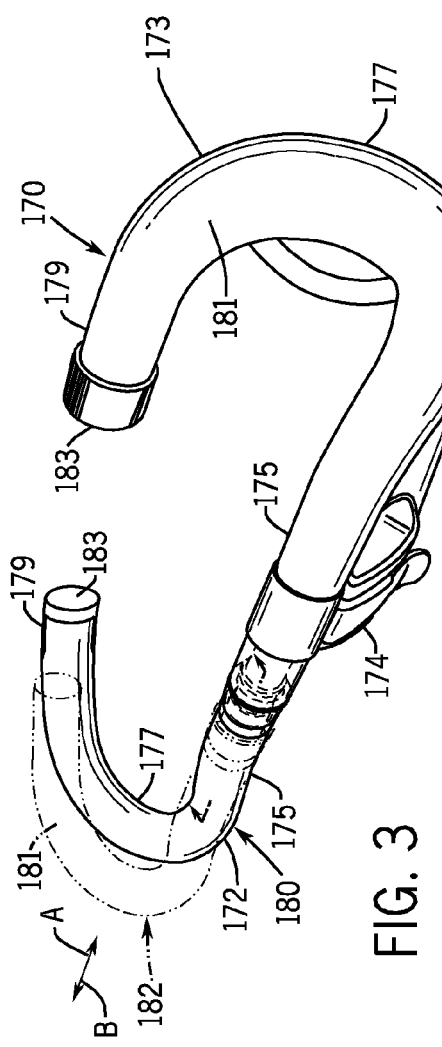
FIG. 3 is a perspective view of a handle assembly of the stroller frame having a movable handle section illustrated in a first retracted position and in a second extended position.

Referring to FIG. 3, the handle 170 includes a pair of handle sections 172 and 173 as described above. Each handle section 172 and 173 includes a proximal portion 175, respectively, that extends laterally outboard from the handle bracket 174. A middle portion 177 curves up and rearward from the laterally outboard end of the proximal end 175. A distal portion 179 curves up and laterally inward from the upper end of the middle portion 177, and terminates at a substantially laterally inwardly extending end 183. The radially outer surfaces of the handle sections 172 and 173 define gripping surfaces 181 that can be formed from a soft material that prevents slippage with the caregiver's hand, and can be gripped in an ergonomically friendly manner.

Advantageously, one of the handle sections (section 172) as illustrated, is movable with respect to the opposing handle section 173. Specifically, the handle section 172 is movable in the lateral direction along the directions indicated by Arrows A and B between a retracted position (position 198A shown in FIG. 3) whereby the proximal end 175 is disposed adjacent the handle bracket 174, to an extended position (position 198B shown in FIG. 3) whereby the proximal end is spaced from the handle bracket 174, respectively. It will thus be appreciated that an adjustable gap is formed between the movable handle section 172 and the bracket 174, and that an adjustable gap is thereby also formed between the movable handle section 172 and the stationary handle section 173.

Figure 4:
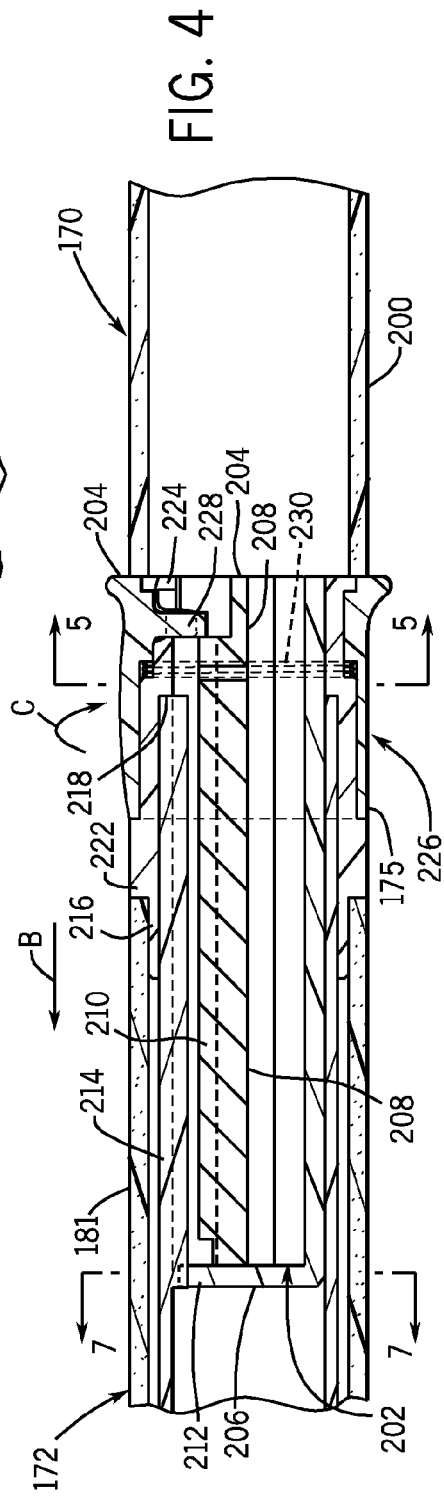
FIG. 4 is a sectional side elevation view of a portion of the handle including the movable handle section illustrated in FIG. 3, with the movable handle section in the retracted position.
Figure 7:
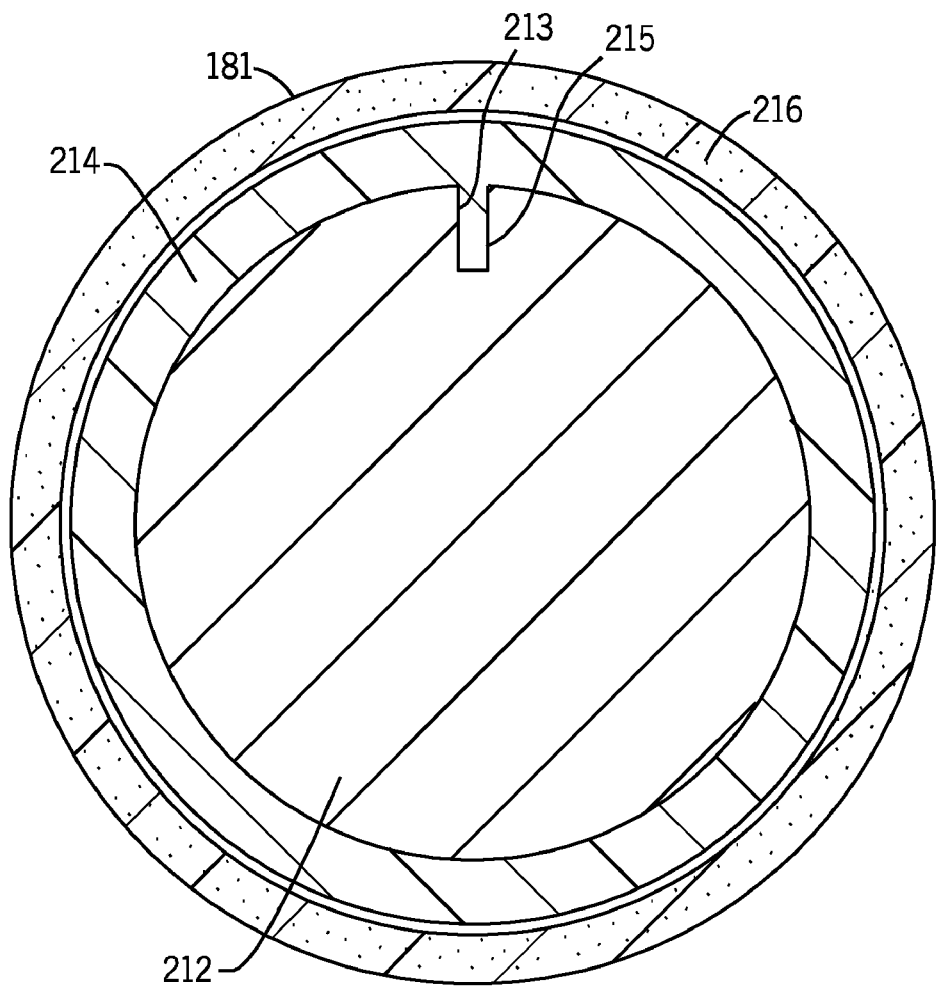
FIG. 7 is a sectional side elevation view taken along line 7-7 of FIG. 4.

Referring now to FIGS. 4 and 7, the handle 170 includes a stationary handle section, for instance a neck 200. Neck 200 can be connected to the handle bracket 174, or can be disposed laterally outboard from the handle bracket 174 as illustrated. The neck 200 is connected to a stem 202 that extends laterally outboard from the neck 200. The stem 202 is substantially annular, and is connected at its proximal end 204 to the neck such that the stem 202 is rotatably fixed with respect to the neck. The stem 202 defines a laterally outer free distal end 206 opposite the proximal end 204, and a middle portion 208 disposed between the proximal end 204 and the distal end 206. The middle portion 208 includes a radially outwardly projecting finger 210 that extends axially between a location spaced from the proximal end 204 and the distal end 206. A cylindrical stop member 212 projects radially outward from the stem 202 at the distal end 206. A slot 213 projects radially into the outer surface of the stop member 212, and extends axially through the stop member.

The handle section 172 is telescopically connected to neck 200, and includes a radially inner cylindrical tube 214 having an inner diameter greater than the outer diameter of the stem 202 such that the inner tube 214 surrounds the stem 202. An axially elongated finger 215 projects radially inward from the inner tube 214 and extends into the slot 213 of the stem 202 to prevent the inner tube 214 from rotating. The inner tube 214 is free to translate axially along the stem 202. An outer cylindrical tube 216 surrounds the inner tube 214, and is coupled to the inner tube such that the outer cylindrical tube 216 is likewise fixed with respect to rotation, but can translate along the stem 202 along with the inner tube 214. The outer tube 216 defines a necked-down section 218 that projects radially inwardly and abuts the axially inner end 220 of the inner tube 214. A locating flange 222 extends radially outwardly from the outer tube 216, and provides a seat for the gripping portion 181, which surrounds the outer tube 216 and extends axially outward from the locating flange 222. A second locating flange 224 extends axially outward from the axially inner end of handle section 172, and is spaced from the axially inner end of outer tube 216.

Figure 5:
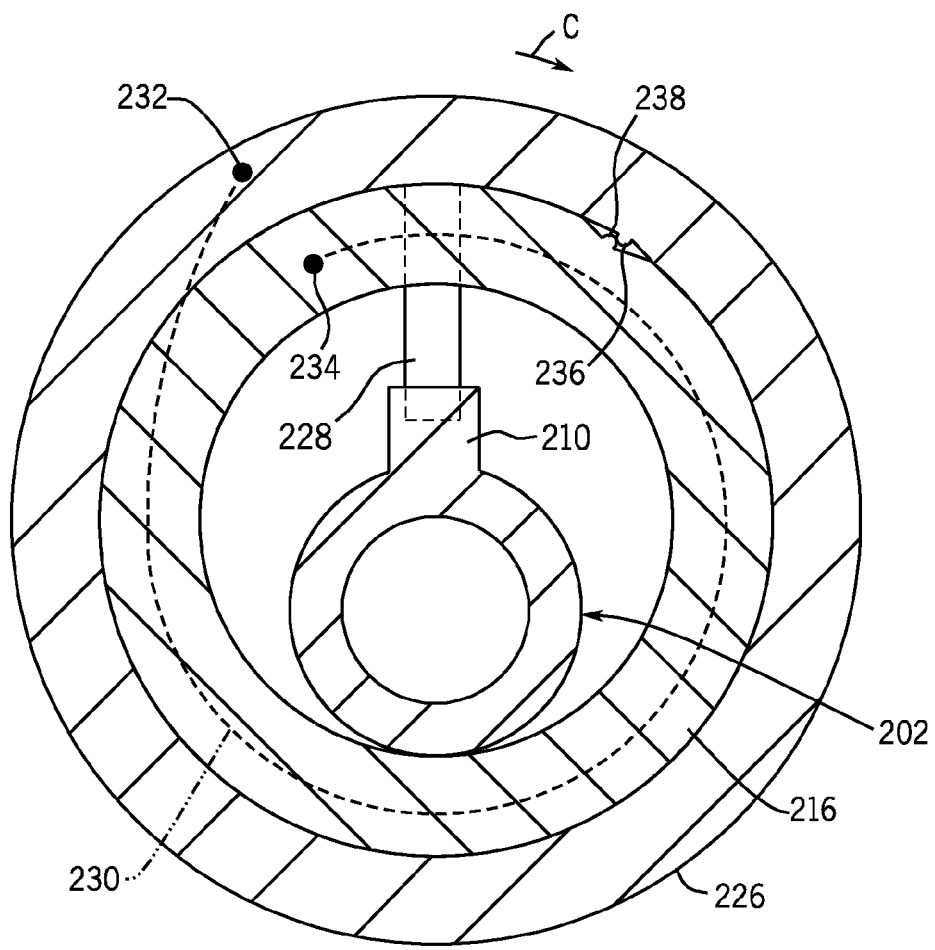
FIG. 5 is a sectional side elevation view taken along line 5-5 of FIG. 4.

Referring now to FIGS. 4-5, the locating flanges 222 and 224 define an axial length therebetween that captures a collar 226 that surrounds the outer tube 216 and is rotatable with respect to the outer tube 216. The collar includes a finger 228 that projects radially inwardly between the axially inner end of the outer tube 216 and the axially outer end of the second locating flange 224. The axially outer end of the finger 228 is disposed axially inward of the finger 210. A torsion spring 230 is connected at one end 232 to the collar and at its second end 234 to the outer tube 216. The spring 230 defines a neutral position that maintains the finger 228 in radial alignment with finger 210. Because the fingers 210 and 228 overlap, the collar, and therefore the handle section 172, is prevented from translating axially outward along the stem 202 from the retracted position.

Figure 6:
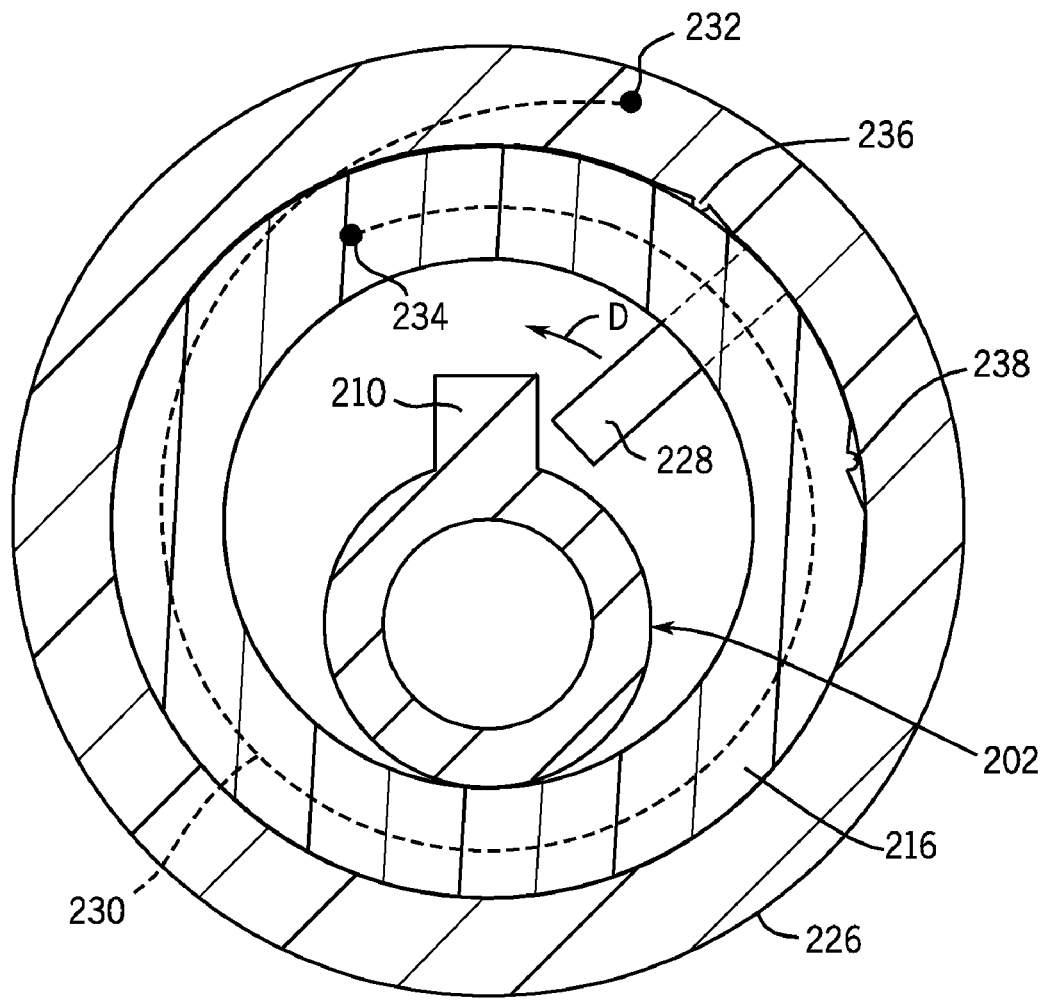
FIG. 6 is a sectional side elevation view similar to FIG. 5, but with the movable handle section oriented to move to the extended position.

Referring also to FIG. 6, in order to move the handle section 172 to the extended position, the caregiver rotates the collar 226 about the outer tube 216, the second locating flange 224, and the inner tube 214 in the direction of Arrow C against the torsional force of spring 230. Advantageously, because the collar 226 is separately rotatable, the orientation of the handle section 172 remains stationary as the collar 226 is rotated. Alternatively, the entire handle section 172 could be rotatable about the stem 202, for instance, if the finger 213 was not engaged in slot 215. A seat (not shown) can extend from the outer tube 216 that engages the finger 228 and prevents the collar 226 from rotating in a direction opposite Arrow C. Alternatively, the collar 226 can be rotated in the direction of Arrow C and in the direction opposite Arrow C. Once the collar 226 is rotated a sufficient amount, the finger 228 becomes radially spaced from finger 210, thus removing the interference between fingers 210 and 228. The caregiver can then translate the collar 226, and hence the handle section 172, axially outwardly along the stem 202 in direction of Arrow B. The stem 202 thus provides a guide member along with the handle section 172 travels between the retracted and the extended positions. The torsion spring 230 can provide a force that biases the finger 210 against the radially extending surface of finger 228 in the direction of Arrow D as the collar 226 is translated axially, such that the finger 228 provides a track on which the collar 226 rides while the handle section is translated.

The present invention contemplates that the handle section 172 should be rotated a sufficient amount to ensure that the finger 228 is not unintentionally disengaged from finger 210. At the same time, the handle section 172 should not be required to rotate an amount that is ergonomically unfriendly. Accordingly, certain aspects of the invention require that the finger 228 clear finger 210 once the handle section 172 has been rotated an angular amount within a range whose lower end is defined by and between 0°, 5°, 10°, and 15° and whose upper range is defined by and between 5°, 10°, 15°, 20°, 45°, and 90°.

As further illustrated in FIG. 5, a first detent 236 can project radially inwardly from the radially inner surface of collar 226, and a second detent 238 can project radially outwardly from the radially outer surface of outer tube 216. The detents are axially aligned, and abut each other when the collar is in the neutral position that produces interference between fingers 210 and 228. Accordingly, a predetermined amount of force is required to cause the detents 236 and 238 to ride over each other, thus preventing the collar from rotating unintentionally.

Figure 8:
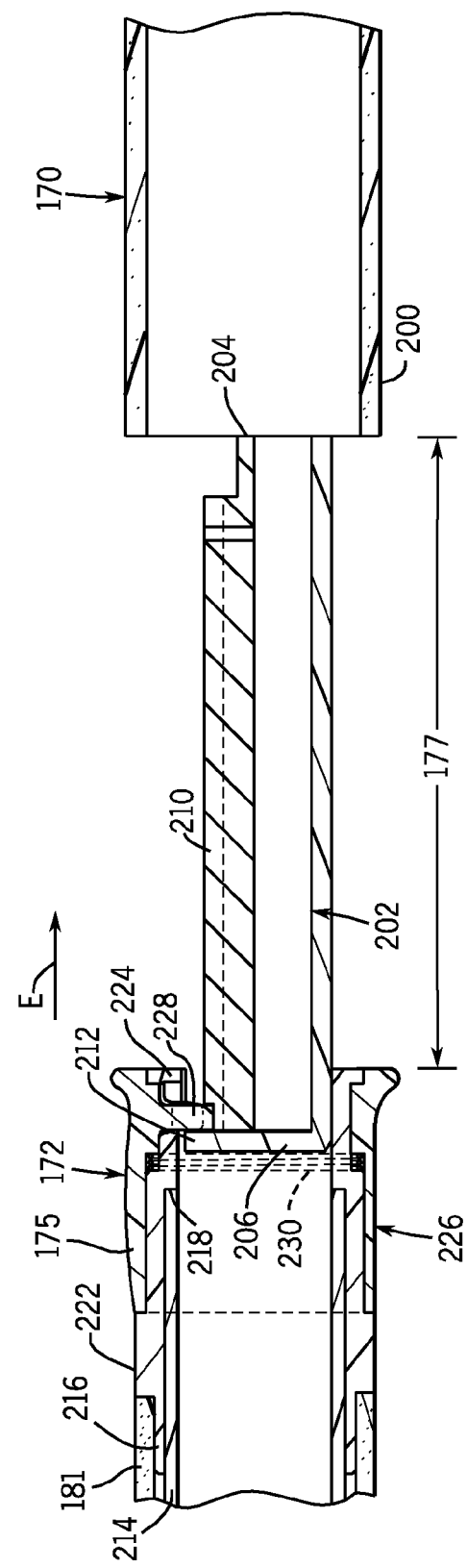
FIG. 8 is a sectional side elevation view of a portion of the handle similar to FIG. 4, but with the movable handle section in the extended position.

Referring to FIG. 8, the handle section 172 can be translated axially outwardly along the direction of arrow B until the finger 210 abuts the stop member 212, at which point the handle section 172 is in the filly extended position. In the fully extended position, a gap 177 extending laterally between the laterally inner end of the handle section 172 and the laterally outer end of neck 200 is greater than when the handle section 172 is in the retracted position. The handle section 172 can be moved to the fully retracted position by translating the handle section axially inwardly along the direction of Arrow E. Once the handle section 172 has been translated to the fully retracted position, the finger 228 of the collar 232 is disposed axially inward with respect to finger 210, and the force of torsion spring 230 biases the collar 232 to the neutral position illustrated in FIG. 5. It should be appreciated that the detents 236 and 238 could be barbed such that they require a greater force to rotate the collar 232 away from the neutral position than the force required to return the collar to the neutral position. As a result, the force of spring 230 is sufficient to cause the detents 236 and 238 to slide past each other when returning the collar 232 to the neutral position. Alternatively, the interference between detents 236 and 238 is overcome in both rotatable directions by similar forces, both forces being less than the biasing force provided by the torsion spring 230.

While certain aspects of the present invention have been described with reference to movable handle section 172, it should be appreciated that the principles of the present invention could alternatively or additionally apply to handle section 173, such that either handle section could be translated between a retracted position and an extended relative to the opposing handle section. Alternatively, both handle sections could be translated between the retracted and the extended positions.

Although certain embodiments have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A stroller comprising:
   a foldable stroller frame;
   a child seat supported by the stroller frame;
   a handle supported by the stroller frame and extending along an axis of the handle in a lateral direction relative to the stroller frame, the handle including a first handle section and a second handle section movably connected with respect to the first handle section; and a collar rotatable about the handle axis to remove an interference such that the second handle section is movable in the lateral direction and relative to the first handle section between an extended position whereby the second handle section is separated from the first handle section by a gap having a first distance, and a retracted position whereby the gap is decreased from the first distance to a second distance.

2. The stroller as recited in claim 1, wherein the gap is decreased to an extent in the retracted position such that the second handle section is disposed immediately adjacent the first handle section.

3. The stroller as recited in claim 1, wherein the second handle section moves substantially linearly between the extended and retracted positions.

4. The stroller as recited in claim 3, wherein the second handle section extends substantially laterally.

5. The stroller as recited in claim 4, wherein the second handle section moves substantially laterally between the extended and retracted positions.

6. The stroller as recited in claim 5, wherein the second handle section has a portion that extends in a direction that intersects with the lateral direction.

7. The stroller as recited in claim 1, wherein the second handle section includes the collar such that the collar is rotatably supported by the second handle section.

8. The stroller as recited in claim 7, wherein the collar comprises a finger that engages a stop member when the second handle section is in the retracted position, whereby the collar is rotatable to remove the engagement between the finger and the stop member.

9. The stroller as recited in claim 8, wherein the second handle section is movable to the extended position when the engagement is removed.

10. The stroller as recited in claim 9, further comprising a torsion spring biasing the collar to a position whereby the finger engages the stop member.

11. A stroller comprising:

a foldable stroller frame;

a child seat supported by the stroller frame; and a handle supported by the stroller frame and extending in a lateral direction relative to the stroller frame, the handle including a first handle section and a second handle section movably connected with respect to the first handle section;

wherein the second handle section includes a collar rotatable about the handle to remove an interference such that the second handle section is movable in the lateral direction and relative to the first handle section between an extended position whereby the second handle section is separated from the first handle section by a gap having a first distance, and a retracted position whereby the gap is decreased from the first distance to a second distance;

wherein the collar is rotatably supported by the second handle section, wherein the collar comprises a finger that engages a stop member when the second handle section is in the retracted position, and wherein the collar is rotatable to remove the engagement between the finger and the stop member.

12. The stroller as recited in claim 11, wherein the gap is decreased to an extent in the retracted position such that the second handle section is disposed immediately adjacent the first handle section.

13. The stroller as recited in claim 11, wherein the second handle section moves substantially linearly between the extended and retracted positions.

14. The stroller as recited in claim 11, wherein the second handle section extends substantially laterally.

15. The stroller as recited in claim 14, wherein the second handle section moves substantially laterally between the extended and refracted positions.

16. The stroller as recited in claim 15, wherein the second handle section has a portion that extends in a direction that intersects with the lateral direction.

* * * * *